Patented July 18, 1939

2,166,246

UNITED STATES PATENT OFFICE 2,166,246

MANUFACTURE OF CALCIUM ARSENATE

Ivan L. Haag, Lakewood, Ohio, assignor to E. I. du Pont de Nemours & Company, Wilmington, Del., a corporation of Delaware No Drawing. Application May 25, 1937, Serial No. 144,640

5 Claims. (Cl. 23—53)

This invention relates to the manufacture of calcium arsenate by lime slurry-arsenic acid processes and is particularly directed to processes characterized in that rapid and turbulent agitation is maintained during the addition of arsenic acid, that is during the strike, whereby a finely divided, light, fluffy, amorphous-like product that may be applied to plants for controlling plant pests with a minimum of injury to the foliage, is obtained, and is directed further to the product so produced.

The usual method for manufacture of calcium arsenate involves the addition of a solution of arsenic acid to a lime slurry. Part of the lime slurry may be added simultaneously with the arsenic acid, provided that the conditions of the addition are such that the arsenic acid is added to the lime slurry rather than lime slurry to arsenic acid. The addition of arsenic acid to a lime slurry in this manner is known in the art as a "strike". After the strike, which may cover a period of several hours, is complete the reaction mixture is adjusted to 41–42 per cent total arsenic, calculated as arsenic oxide ($As_2O_5$), by adding either arsenic acid or lime slurry, as required. This adjustment is known in the art as the "end-point adjustment". The product may then be filtered and dried or dried directly without filtering.

The product so obtained varies in composition in that it contains different entities of calcium arsenate such as mono-, di- and tri-calcium arsenate and various basic arsenates. Certain of these different entities, particularly the less basic ones, are water soluble and are undesirable constituents for the reason that they cause burning of foliage when the calcium arsenate is used for the control of plant pests. Ordinarily the solubility of the less basic arsenates is suppressed by the presence of an excess of lime, which reduces the solubility of the di- and tri-calcium arsenates materially. In many cases, however, the amount of water-soluble arsenic present is sufficient to cause burning of foliage.

Altho the amount of water-soluble arsenic may be small initially, it increases very rapidly during storage and exposure to the atmosphere. This increase in the water-soluble arsenic has been attributed to carbonation of the excess lime by the carbon dioxide of the atmosphere. The conditions of exposure when calcium arsenate is applied to plants is extremely favorable to carbonation so that a material, altho initially low in water-soluble arsenic, may, nevertheless, cause severe burning of the foliage. Consequently, when calcium arsenate produced in the usual manner is stored or otherwise exposed to the atmosphere, the water-soluble arsenic increases to amounts which render the calcium arsenate unsafe for application to foliage.

Altho it has been recognized that the water-soluble arsenic is responsible for the burning of the foliage it has been found that analysis of the material on this basis gives no reliable index of the safeness of calcium arsenate. This is due to the fact that the water-soluble arsenic increases as a result of storage and exposure to the atmosphere. In other words the usual method of analysis, for water-soluble arsenic (the standard bromate method) indicates the initial or apparent water-soluble arsenic only, and does not take into account the available or *total* water-soluble arsenic.

In order to provide a reliable index of the safeness of calcium arsenate, a special method of analysis has been developed determining the *total* water-soluble arsenic. In this special method of analysis the excess lime is carbonated by titrating a sample of the calcium arsenate with a standard solution of carbon dioxide to a permanent thymolphthalein endpoint, after which the water-soluble arsenic is determined by the standard bromate method. A detailed procedure is given in Technical Bulletin No. 234 of the New York State Agricultural Experiment Station. In this test, as in the usual method, water-soluble arsenic is determined as arsenic oxide ($As_2O_5$).

Exhaustive tests have shown that the *total* water-soluble arsenic is a reliable index of the safeness of calcium arsenate for application to foliage. In this connection it has been found that a "safe" calcium arsenate is one that has a *total* water-soluble arsenic content, calculated as arsenic oxide ($As_2O_5$), of less than 0.75 per cent, as determined by the special method of analysis outlined above. Where the *total* water-soluble arsenic exceeds this value, burning of the foliage is excessive.

Various procedures have been suggested in the past for reducing the *total* water-soluble arsenic content of commercial calcium arsenates. One such procedure involves the treatment of the calcium arsenate in an autoclave, that is, by subjecting it to steam at 150 pounds gage pressure for about two hours. This procedure is said to convert the water-soluble arsenates to a more basic and less soluble form, thereby reducing the *total* water-soluble arsenic to a safe value. This procedure, however, is uneconomical and not adapted to large scale commercial application. The additional expense of so processing commercial calcium arsenate virtually prohibits commercial adoption of this process.

Another procedure involves the addition of stabilizing agents such as fluorine compounds. This procedure, like the autoclave treatment, however, requires supplementary treatment and entails additional expense in the manufacture of calcium arsenate. Furthermore, the product so produced has inferior dusting properties, as the added compounds materially increase its weight.

By the processes according to this invention, which are principally characterized by rapid and turbulent agitation during the lime slurry-arsenic acid strike, safe products within the terms of the definition given above can be consistently produced in an economical and efficient manner without requiring any additional processing or the addition of any foreign materials. By rapidly and turbulently agitating the lime slurry-arsenic acid strike according to the processes of this invention, the reaction between the lime slurry and the arsenic acid is so controlled and regulated that a product is formed which not only has a *total* water-soluble arsenic content of less than 0.75 per cent but also has an entirely different physical form from the calcium arsenates heretofore available.

The products produced as a result of rapid and turbulent agitation during the lime slurry-arsenic acid strike are very light, fluffy, and finely divided, and have a distinct amorphous-like character in contra-distinction to the crystalline appearance of calcium arsenates heretofore available. The light and fluffy character of the product so produced is manifest by its large volume per unit weight. For example, by the standard Coad volume test it exhibits an average volume per unit weight of about 100 cubic inches per pound with less than 15 cubic inches variation. This represents an increase of more than 30 per cent over the corresponding Coad volume for calcium arsenates heretofore available.

The products of the processes according to this invention are further characterized by the ability to withstand storage and exposure to the atmosphere over long periods without any material increase in the *total* water-soluble arsenic content. Consequently they may be applied to foliage without danger of burning, and they may be stored from one season to the next without any material decrease in their safeness.

The low *total* water-soluble arsenic content of the products according to this invention, their stability during periods of exposure to the atmosphere, and their light, fluffy, and amorphous-like character all contribute to the production of a material eminently suited for applications to plants in the control of plant pests. The low *total* water-soluble arsenic content coupled with stability during exposure contribute to making a safe product which may be applied to the foliage without danger of burning, and the light, fluffy, amorphous-like character contributes improved dusting properties.

The invention may be more readily understood by consideration of the following examples:

*Example I*

According to this example 1050 parts by weight of an 18 per cent lime slurry was prepared by slaking 204 parts by weight, calculated as 100 per cent calcium oxide (CaO), of a burnt lime. A slow sweep type paddle was used to obtain thorough mixing of the lime with the water. The lime slurry so prepared was reacted with 770 parts by weight of 26° Baumé arsenic acid, having an arsenic oxide ($As_2O_5$) equivalent of 170 parts by weight, according to the following procedure.

Approximately 150 parts by weight of the lime slurry was charged into a steam heated batch tank and heated to boiling. Simultaneously therewith the slurry was agitated very rapidly by means of a sweep type paddle. The strike was then made by adding the remaining lime slurry and the arsenic acid simultaneously to the batch tank at approximately equal rates by means of an impeller type recirculating pump. Three hours were required to complete this addition.

The temperature of the lime slurry and the arsenic acid, tho respectively about 150° C. and about 95° C. at the beginning of the strike, dropped somewhat over the period of the strike. These temperatures resulted from the slaking of the lime and the manufacture of the arsenic acid respectively and were influenced by the time of storage of the two ingredients. No effort was made to maintain these temperatures at any given value, as in the normal operation of the plant the temperature of the lime slurry may vary from about 120° F. to near boiling and that of the arsenic acid from room temperature to about 130° F.

The strike was considered complete when the last of the arsenic acid was added. At this time approximately 150 parts by weight of lime slurry remained. The steam heater was then turned off but the agitation was continued for 15 minutes. A sample was then withdrawn for analysis, the agitation stopped, and the batch allowed to settle for 30 minutes. After syphoning off several inches of clear liquor from the top of the batch, the agitation was started again and additional lime slurry was added to adjust the endpoint to 41 per cent arsenic oxide. Agitation was continued for a period of 5 minutes after the endpoint adjustment.

The strike slurry was then dried by means of a drum drier operating at a steam pressure of 50 pounds gage, and the resulting product disintegrated by means of a mechanical disintegrator.

The product so obtained had a *total* water-soluble arsenic content, determined by the special method of analysis given above, of 0.33 per cent; it had a Coad volume of 106 cubic inches per pound, and 99.4 per cent passed freely thru a 325 mesh screen. In appearance it was very light, fluffy, and amorphous-like.

In the above example rapid and turbulent agitation was maintained thruout the period of the strike and thruout the endpoint adjustment by means of an impeller type recirculating pump in addition to the above-mentioned sweep type paddle. In order to minimize local reactions the arsenic acid was introduced into the suction side of the recirculating pump where it would immediately become intimately mixed with the lime slurry. Large agitating equipment was required in view of the quantity of material processed—approximately 10,000 pounds of lime slurry and 7,700 pounds of arsenic acid. Inasmuch as variations in such large scale operations are not feasible, tests were run on a smaller scale to determine the influence of the rate of agitation. In these tests the procedure, except as to certain variations made for the purposes of comparison, were the same as in Example I. The following example is given to show the effect of varying the rate of agitation:

*Example II*

According to this example tests were made using different rates of agitation. The rates of agitation were classified as very good, good, poor, and very poor, depending upon the degree of turbulence produced by the different types of agitators and the rate at which they were operated.

Very good agitation was obtained by the use of a "Lightnin Mixer". This agitator was of standard design and consisted of a small propeller on the end of a motor driven shaft rotating at 1725 R. P. M. The propeller consisted of two blades having a combined length of four inches and a maximum width of one inch. Good agitation was obtained with an agitator consisting of three three-bladed paddles four inches in length operated at a rate of 107 R. P. M. These paddles were spaced, one at the bottom, one in the middle, and one at the top of the strike tank so that the bottom one would give good agitation at the start of the batch, the middle would carry on as the addition progressed, and the top one would be just below the surface of the batch when addition of materials was complete. Poor agitation was obtained by using the same three three-bladed paddles described above, but operating at 30 R. P. M. Very poor agitation was obtained by using a single three-bladed paddle at the bottom of the shaft operating at 30 R. P. M.

Four tests were made using rates of agitation described above. In these tests 100 pounds of 18 per cent lime slurry was reacted with 75 pounds of 23° Baumé arsenic acid, 15 pounds of the lime slurry being charged into a 50 gallon batch tank prior to the simultaneous addition of the lime slurry and arsenic acid. The remaining procedure, with the exception that the arsenic acid, as added, was of room temperature, was the same as in Example I. Each of the four tests, except for the rate of agitation, were made under conditions as nearly identical as possible.

The first test was made using the Lightnin Mixer, which gave rapid and very turbulent agitation. Analysis of the product showed a *total* water-soluble arsenic content of 0.35 per cent. This is well below the maximum value for safe calcium arsenate.

The second test, using three three-bladed paddles at 107 R. P. M., gave very rapid, somewhat less turbulent, agitation. Analysis of the product gave a *total* water-soluble arsenic content of 0.43 per cent.

The third test, using three three-bladed paddles at 30 R. P. M., gave a moderate degree of agitation. Analysis of the product gave a *total* water-soluble arsenic content of 2.54 per cent. This value is well above the maximum for safe calcium arsenate.

The fourth test, using a single three-bladed paddle at 30 R. P. M., gave very poor agitation, amounting to little more than a mere gradual mixing. In this test the *total* water-soluble arsenate amounted to 5.09 per cent which, of course, is materially above the value for safe calcium arsenate.

The results of these tests are tabulated in the following table:

*Table I*

| | Type of agitation | Total water-soluble arsenic, percent |
|---|---|---|
| 1 | Very good—using "Lightnin Mixer." Gave turbulent mixing. | 0.35 |
| 2 | Good—using three 3-bladed paddles at 107 R. P. M. | 0.43 |
| 3 | Poor—using three 3-bladed paddles at 30 R. P. M. | 2.54 |
| 4 | Very poor—using one 3-bladed paddle at 30 R. P. M. Gave gradual mixing. | 5.09 |

From a consideration of these tests it is evident that the *total* water-soluble arsenic content decreases very rapidly as the rate of agitation is increased, and that very poor results are obtained when the rate of agitation approaches that obtainable by stirring or by little more gradual mixing. It is evident from these tests that rapid and turbulent agitation is essential to the production of a safe calcium arsenate.

Numerous other tests have been carried out for the purpose of determining what influence other factors have upon the *total* water-soluble arsenic content. It was found, however, that variations in other factors have little, if any, effect upon the *total* water-soluble arsenic content except as they modify the viscosity of the lime slurry and consequently the rate of agitation.

Thus it was found that the best results were obtained at temperatures around 75° C. and 80° C., as the viscosity of the lime slurry was at a minimum at these temperatures. At higher temperatures the consistency of the lime slurry increased to a slightly creamy consistency at boiling, and at temperatures between 30° C. and 55° C. the lime slurry had a consistency much like a thick paste. Altho the consistency of the lime slurry is somewhat thicker at higher temperatures, that is near boiling, it has little effect upon the *total* water-soluble arsenic content, provided rapid and turbulent agitation is maintained thruout the strike. The slight increase in the consistency of the lime slurry at or near boiling, however, is not sufficient to warrant any elaborate system of temperature control. Consequently, from a commercial standpoint it is more economical to maintain the temperature of the lime slurry at, or near boiling, particularly as the constant addition of lime slurry and arsenic acid during the strike will have sufficient cooling effect in large scale operations to lower the overall temperature somewhat below the boiling point.

It has also been found that the concentration of the lime slurry affects the rate of agitation. Thus a ten per cent lime slurry is more easily actuated to rapid and turbulent agitation than an eighteen per cent lime slurry. The improvement, however, which may be attributed to the lower concentration is outweighed by the increased cost of handling the additional volume of material required. Commercially I have found that the best overall results may be obtained with a lime slurry of about eighteen per cent.

One of the outstanding characteristics of the product made according to the processes of my invention is its ability to withstand exposure to the atmosphere without any material increase in its *total* water-soluble arsenic content. Thus my product may be stored from one season to another and yet be safely applied to foliage. Likewise it may be applied to foliage without the danger of subsequent burning of the foliage. In order more fully to illustrate this property and to compare it with the regular grade of calcium arsenate produced in the usual manner, the following example is given:

*Example III*

Comparative stability tests were made by subjecting 250 grams of each grade to the action of moist carbon dioxide in rotating quart sized cans. Samples were withdrawn and analyzed at regular intervals.

The free lime, both in the product of my invention and in calcium arsenate produced by the usual procedure, was reduced from an original of about 12 per cent to about one per cent in 130 hours. The decrease in free lime content in each case was directly proportional to the carbon dioxide pick-up. In both cases the carbon dioxide absorption was very rapid up to about five per cent carbon dioxide, at which point the rate slowed up sharply. In this respect, therefore, the two products are very similar.

The burning of foliage by material which has deteriorated in storage, however, is thought to be due to increase in water-soluble arsenic. (In this case the standard procedure, not the *total* water-soluble arsenic is referred to). The water-soluble arsenic increased more rapidly on the regular than on the improved product made according to the processes of my invention. This is shown in the following table:

*Table II*

| Hrs. of $CO_2$ gassing | Regular product | | | Improved product | | |
|---|---|---|---|---|---|---|
| | $CO_2$, percent | Free CaO, percent | Water-soluble arsenic, percent | $CO_2$ percent | Free CaO, percent | Water-soluble arsenic, percent |
| 0 | 0.80 | 12.50 | *0.03 | 1.21 | 12.43 | *0.00 |
| 1.5 | 5.10 | 7.40 | 0.09 | 4.84 | 8.00 | 0.012 |
| 24 | 6.25 | 5.79 | 0.095 | 6.20 | 5.75 | 0.006 |
| 48 | 7.26 | 4.57 | 0.261 | 7.26 | 5.37 | 0.065 |
| 72 | 8.44 | 2.74 | 0.51 | 8.27 | 3.67 | 0.088 |
| 100 | 9.94 | 1.35 | 1.29 | 9.86 | 2.63 | 0.171 |
| 124 | 11.00 | 0.71 | **3.04 | 11.00 | 1.18 | *0.66 |

*These figures correspond to the initial or apparent water-soluble arsenic.
**These figures correspond to the actual or *total* water-soluble arsenic.

These tests represent extremely severe conditions and are equivalent to many months of storage under ordinary conditions. These data accordingly clearly show that the products according to my invention have definitely superior ability to withstand storage and exposure to the atmosphere.

It is to be understood that the foregoing examples are illustrative only of the preferred manner of carrying out my invention, and that the specific details of the procedure may be varied widely so long as rapid and turbulent agitation is maintained during the strike.

Although I have disclosed specific proportions, specific rates, and specific procedures for adding arsenic acid to lime slurry, it will be understood that these features do not in themselves involve any departure from the prior art and that any suitable manner of effecting a strike between the lime slurry and arsenic acid may be used. Similarly, endpoint adjustment may be made in any suitable manner, either by the addition of additional lime or arsenic acid, as required. Furthermore, it is apparent that the endpoint adjustment is not an essential step, as considerable variation in the arsenic acid content is admissible without detrimentally affecting the product. The inclusion of this step in my process, however, is desirable from a commercial standpoint where a uniformly consistent product is desirable.

It is to be understood also that other steps in the described processes such as drying and disintegrating do not in themselves constitute a part of this invention, and that any suitable means may be employed for this purpose. If desired, the disintegrator may be eliminated, depending upon the use to which the product is to be put and the type of drying mechanism. Ordinarily it has been found advantageous to use the disintegrator in conjunction with a drum drier such as referred to in Example I, in order to break up any cakes which may have formed during the drying. It is obvious, tho worthy of mention, that the particle size is not influenced by disintegration, as the disintegrator merely breaks up cakes which may have formed during the drying step. On the contrary, the ultimate particle size is dependent in the main upon the manner in which the strike is effected.

By rapidly and turbulently agitating lime slurry during the strike the reaction is accelerated so that the fifteen minutes continued agitation after completing the strike is usually more than ample to insure substantially complete reaction. It will be understood, however, that this period of additional agitation may be decreased or increased, as desired, or may be eliminated entirely. It is desirable, however, that the agitation be continued long enough to insure uniform consistency thruout the batch before it is allowed to settle, prior to the endpoint adjustment.

According to the processes of my invention any suitable means may be employed for obtaining rapid and turbulent agitation. I have already described in detail certain types, but it is to be understood that my invention is in no way limited thereto. Thus I may use agitators of sufficient capacity to maintain the entire strike-slurry in a state of rapid and turbulent agitation or I may use agitators capable of maintaining intense local agitation at the point of addition of the arsenic acid while the strike-slurry in the batch tank is in a state of moderate agitation.

I claim:

1. In the manufacture of basic calcium arsenate by the addition of arsenic acid to lime slurry with agitation the method for obtaining a basic calcium arsenate having amorphous-like properties and a *total* water-soluble arsenic content less than 0.75 per cent which comprises maintaining a body of lime slurry in a state of agitation, introducing a further quantity of lime slurry by means of an impeller type pump, and simultaneously introducing arsenic acid into the suction side of said pump, the rate of addition of lime slurry and arsenic acid being so adjusted that the excess of lime initially present in the reaction mixture gradually diminishes to an endpoint at which the reaction product contains in the order of 41 per cent arsenic oxide.

2. In the manufacture of basic calcium arsenate by the addition of arsenic acid to lime slurry with agitation the method for obtaining a basic calcium arsenate having amorphous-like properties and a *total* water-soluble arsenic content less than 0.75 per cent which comprises maintaining a body of lime slurry in a state of agitation and at a temperature in the vicinity of the boiling point, introducing a further quantity of lime slurry thereto by means of an impeller type pump at a temperature above about 120° F., and simultaneously therewith introducing arsenic acid into the suction side of said pump at a temperature from room temperature to about 130° F., the rate of addition of lime slurry and arsenic acid being so adjusted that the excess of lime initially present in the reaction mixture gradually diminishes to an endpoint at which the reaction product contains in the order of 41 per cent arsenic oxide.

3. In the manufacture of basic calcium arsenate by the addition of arsenic acid to a lime slurry with agitation the method for obtaining a basic calcium arsenate having amorphous-like properties and a *total* water-soluble arsenic content less than 0.75 per cent which comprises maintaining a body of lime slurry in a state of agitation and introducing arsenic acid and a further quantity of lime slurry simultaneously while maintaining at the point of strike a zone or rapid and turbulent agitation, the rate of addition of lime slurry and arsenic acid being so adjusted that the excess of lime initially present in the reaction mixture gradually diminishes to an endpoint at which the reaction product contains in the order of 41 per cent arsenic oxide.

4. The process of claim 3 in which the temperature of the reaction mixture is maintained above about 70° C.

5. The process which comprises causing violent confluence of two confluent streams one of which is composed of aqueous arsenic acid and the other of which is composed of hydrated lime in aqueous suspension, and dispersing the confluence of the two streams into a reaction mixture initially composed of hydrated lime in aqueous suspension while maintaining the reaction mixture in a state of agitation, the rate of flow of the two confluent streams being so adjusted that the excess of lime initially present in the reaction mixture gradually diminishes to an endpoint at which the reaction product contains in the order of 41 per cent arsenic oxide.

IVAN L. HAAG.

CERTIFICATE OF CORRECTION.

Patent No. 2,166,246.  July 18, 1939.

IVAN L. HAAG.

It is hereby certified that error appears in the printed specification of the above numbered patent requiring correction as follows: Page 4, first column, line 31, in the table, last column thereof, for "*0.66" read **0.66; and that the said Letters Patent should be read with this correction therein that the same may conform to the record of the case in the Patent Office.

Signed and sealed this 10th day of October, A. D. 1939.

(Seal)

Henry Van Arsdale,
Acting Commissioner of Patents.